United States Patent [19]
Potthoff et al.

[11] Patent Number: 5,088,576
[45] Date of Patent: Feb. 18, 1992

[54] MASS AND SPRING SYSTEMS FOR SOUNDPROOFING

[75] Inventors: Hans-Hermann Potthoff, Heidelberg-Kirchheim; Ingolf Scheffler, Wiesloch; Klaus Ruch, Wiesloch/Baiertal; Rainer Joesel, Karlsruhe, all of Fed. Rep. of Germany

[73] Assignee: E.A.P. Akustik GmbH, Heidelberg, Fed. Rep. of Germany

[21] Appl. No.: 378,896

[22] Filed: Jul. 12, 1989

[30] Foreign Application Priority Data

Jul. 16, 1988 [DE] Fed. Rep. of Germany ....... 3824171

[51] Int. Cl.$^5$ .......................... E04B 1/82; E04B 2/02
[52] U.S. Cl. .................... 181/290; 181/291; 181/294
[58] Field of Search ................. 181/290–294

[56] References Cited

U.S. PATENT DOCUMENTS

| | | | |
|---|---|---|---|
| 2,116,771 | 5/1938 | Seaman | 181/290 X |
| 2,184,139 | 12/1939 | Cunnington | 181/290 X |
| 3,072,582 | 1/1963 | Frost | 181/294 X |
| 3,489,242 | 7/1970 | Joschko | 181/208 |
| 3,801,535 | 1/1974 | Gladding et al. | 524/731 |
| 4,346,782 | 8/1982 | Bohm | 181/294 X |
| 4,574,915 | 3/1986 | Guhlau et al. | 181/294 X |

FOREIGN PATENT DOCUMENTS

| | | | |
|---|---|---|---|
| 1817834 | 8/1968 | Fed. Rep. of Germany. | |
| 2014894 | 10/1970 | Fed. Rep. of Germany. | |
| 2735153 | 2/1979 | Fed. Rep. of Germany. | |
| 2610442 | 8/1988 | France | 181/293 |
| 300138 | 10/1929 | United Kingdom | 181/293 |

OTHER PUBLICATIONS

"Shoe inserts absorb impact shock," Plastics Engineering, Jun. 19, 1983, p. 15.
"Polymer Softens Impact and Quiets Noise," Machine Design, Mar. 21, 1985, p. 66.

Primary Examiner—Brian W. Brown
Assistant Examiner—Khanh Dang
Attorney, Agent, or Firm—Valerie E. Looper; Steven T. Trinker

[57] ABSTRACT

A mass and spring system for soundproofing, particularly in vehicles, comprises a bending-soft heavy plastic layer as the mass and a soft layer as the spring, which is applied to the sound radiating surface or wall and which is a gel of 10 to 50% by weight of an organic polymer or silicone polymer and 50 to 90% by weight of a plasticizer compatible therewith, which at room temperature has a modulus of elasticity $E' \leq 5 \times 10^5$ Pa and an internal loss factor $d \geq 0.5$.

14 Claims, 1 Drawing Sheet

MASS AND SPRING SYSTEMS FOR SOUNDPROOFING

It is known to improve the sound insulation in sound radiating walls or surfaces through the double wall effect. A bending-soft heavy plastic layer (mass) is placed at a distance of 10 to 30 mm from the wall to be insulated, e.g. a vehicle body sheet. The space between the sheet and the plastic layer is filled with a non-woven fabric or a soft polyurethane foam (spring). Such mass and spring systems ensure that vibrating components, e.g. vehicle body sheets, which for certain reasons cannot be deadened by muffling layers, do not radiate excessive air-transmitted sound.

Normally the cover layer (mass) is constituted by heavy plastic sheets, which comprise thermoplastics such as ethylene/vinyl acetate copolymers with a high content of specifically heavy fillers such as barium sulphate and therefore having a high mass per surface unit. However, for obvious reasons the usable mass is limited, particularly in vehicles and more especially in cars.

The spring layer should be as soft as possible and have a high inner muffling. However, limits are placed on the attainable softness firstly by the general characteristics of these materials and secondly because such mass and spring systems must have a certain minimum strength. For example, if they are used as a floor covering in a vehicle, it is vital to have an adequate scuff resistance.

The known mass and spring systems advantageously lead to improved sound insulation at higher frequencies, but suffer from the disadvantage that there are resonance breakdowns in the lower frequency range. The resonant frequency is determined by the softness of the spring and the size of the mass. Below the resonant frequency the exciting acoustic vibration is fully transmitted. In the vicinity of the resonant frequency there is also an amplitude rise, whose magnitude is dependent on the internal deadening of the mass and spring system. It is only well above the resonant frequency that the desired sound insulation is obtained. However, the vibrations of four-cylinder four-stroke engines of cars are in such low frequency ranges (second engine order), that the known mass and spring systems do not prove to be completely satisfactory.

The problem of the present invention is to improve the acoustic characteristics of known mass and spring systems without increasing the mass. An effective vibration decoupling of the mass layer from the vibrating carrier material (e.g. a body wall) with the result that no further airborne sound is radiated to the outside is to be achieved at lower frequencies. It is simultaneously wished to suppress resonance phenomena (amplitude increase) in certain frequency ranges and to bring about an effective solid-borne sound insulation without additional use of deadening layers.

It has surprisingly proved possible to solve the aforementioned problem in that in a mass and spring system of the fundamentally known construction comprising a bending-soft heavy plastic layer as the mass and a soft layer as the spring (which engages on the sound-radiating, vibrating surface or wall), the soft layer serving as the spring is a mixture of 10 to 50% by weight of an organic polymer or silicone polymer and 50 to 90% by weight of a plasticizer compatible therewith, which at room temperature has a modulus of elasticity $E' \leq 5 \times 10^5$ Pa, preferably $E' \leq 10^5$ Pa and an internal loss factor of $d \geq 0.5$, preferably $d \geq 0.75$. Optionally the soft layer can also contain fillers.

According to a preferred embodiment the inventively composed soft layer can be foamed, i.e. have a porous structure.

BRIEF OF DESCRIPTION OF THE DRAWINGS

Figure 1:
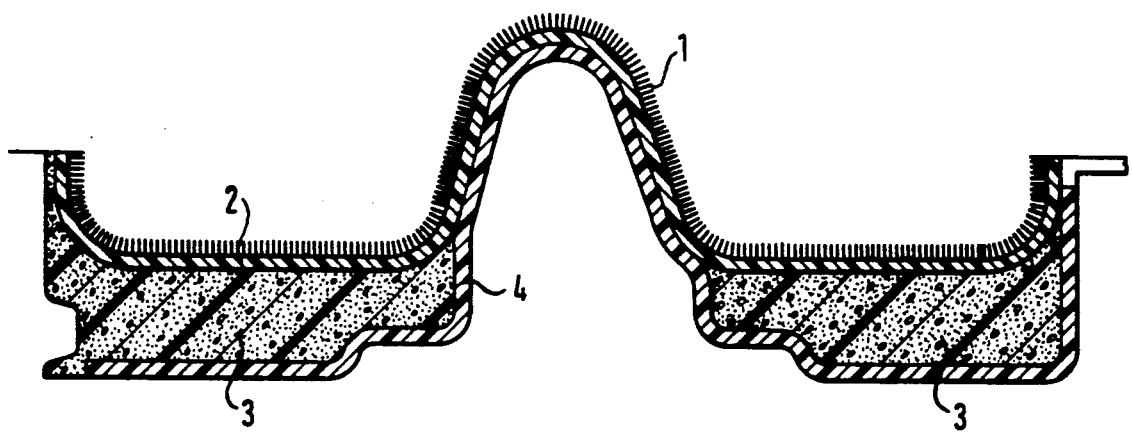
FIG. 1 is a sectional view of a preferred embodiment of the subject mass and spring system.

The attached FIG. 1 shows a preferred embodiment of the inventive mass and spring system as a floor covering for a vehicle and in section. The outermost layer is constituted by a carpet material 1, under which is located the heavy plastic layer (mass 2). The inventively composed soft layer (spring 4), on fitting in a vehicle, engages positively on the sound radiating, vibrating body wall, i.e. in the present case the floor sheet. The represented embodiment also shows that the inventive soft layer can be used both alone and combined with conventional polyurethane soft foams 3 in mass and spring systems so as to constitute the spring. However, the additionally present soft foam material 3 essentially only fulfils the necessary contour compensation and it is extensively freed from its acoustic function, so that simpler (less expensive) materials can be used. As a result of its material characteristics and despite its excellent dynamic softness, the inventive soft layer 4 is still adequately scuff resistant for use in the floor area.

As a result of its high loss factor the inventive soft layer can also be used as the sole spring for efficient solidborne sound insulation in accordance with the function of constrained layer systems.

The tensile strength according to DIN 53571 is >110 kPa, the breaking elongation according to DIN 53571 is >110% and the compression set according to DIN 53572 is <6%. These values are largely retained after moist aging (DBL 5305/24; 3 cycles) and thermal aging (100° C., 7 days), i.e. the aging behaviour is not inferior to that in the case of soft polyurethane foam. The same applies with regards to the resistance brake fluid, lubricating oil, fuels and detergents.

The inventive mass and spring systems are preferably manufactured in such a way that a heavy plastic sheet, which is already optionally lined with the carpet material, is deep drawn and subsequently the soft layer is applied by a spraying or injection process in a mould to the back surface. In certain cases it is possible for weight saving reasons to only zonely apply the soft layer. It is alternatively also possible to spray the soft layer in the form of a one-component material, e.g. as a plastisol, or in the form of a two-component material hardening or curing at room temperature or moderately elevated temperature to the sound radiating surface and subsequently to apply the heavy layer to said soft layer.

As an effective vibration insulating material, the inventive soft layer should in the cured state and in the case of limited mechanical deflection (compression or tension) have a very low modulus of elasticity. In order that the dimensional stability is maintained, the modulus of elasticity must still be adequately high in the case of significant deflection. These characteristics are satisfied by the inventively chosen polymer systems with adequately low glass transition point and low degree of crosslinking.

Inventively suitable are weakly crosslinked polydimethylsiloxanes produced from hydroxy terminated oligodimethylsiloxanes (molecular weight 30,000 to 80,000) with di or trifunctional silane crosslinking agents of the di/tri acetoxyethylsilane type by reacting with moisture. These systems are made soft with non-reactive silicone oils of the polydimethylsiloxane type (molecular weight 200 to 10,000). It is also possible to use thermosetting, platinum compound-catalyzed one and/or two-component silicone polymers, which are also plasticized with the non-reactive silicone oils. The proportion of crosslinkable polymer, including crosslinking agent is between 15 and 40, preferably between 20 and 30% by weight, whilst the proportion of the plasticizer (silicone oil) is between 60 and 85% by weight.

In addition, strongly plasticized plastisols are suitable. The polymer is either a polyvinyl chloride homopolymer or a polyvinyl chloride/vinyl acetate copolymer or a copolymer of methylmethacrylate with other methacrylates, such as e.g. butylmethacrylate, 2-ethylhexylmethacrylate or a styrene homopolymer or copolymer with acrylonitrile, butadiene or (meth)acrylates. It is also possible to use mixtures of PVC with methylmethacrylate/butylmethacrylate copolymers or styrene (co)-polymers. The phthalate, adipate or sebacate plasticizers, alkyl sulphonates or trialkyl (aryl) phosphates conventionally used in plastisol technology constitute the plasticizers. The polymer powder content is 10 to 20% by weight and the plasticizer content correspondingly 80 to 90% by weight. These plastisols are converted in conventional manner by heating into plastigels.

Inventively particularly suitable are plasticized polyurethane polymers based on polyether diols and triols with aliphatic or aromatic diisocyanates or compatible mixtures of polyether diols and/or triols with polyester diols with aromatic or aliphatic diisocyanates. Typically preferred examples for polyether diols are polypropylene glycols of molecular weight 2000 and for polyether triols polypropylene oxide/polyethylene oxide copolymers of molecular weight 3000 to 6000 obtained by the addition of propylene oxide/ethylene oxide to glycerol or trimethylol propane. Particularly preferred polyester diols are hydroxy terminated neopentyl glycol adipates of molecular weight 2000. Preferred diisocyanates are p-tetramethylxylenediisocyanate (p-TMXDI) or 4,4'-diphenylmethanediisocyanate (MDI). Phthalic acid diesters are particularly preferred as plasticizers, e.g. esters of mainly straight-chain $C_7$-$C_{11}$-alcohols or alcohol mixtures. The polymer content is preferably 30 to 50% by weight and that of the plasticizer fraction 50 to 70% by weight.

The following examples serve to further illustrate the invention, but the latter is not limited thereto. The loss factor was in each case determined at room temperature and 50 to 100 Hz by means of the vibrometer method (i.e. with low mechanical deflection) and based on DIN 53426.

EXAMPLE 1

Moisture-Hardening Silicone Gel

A mixture was prepared from the following components:

| | |
|---|---|
| α-ω-dihydroxypolydimethylsiloxane (mw 80,000) | 30 parts |
| tris-acetoxyethylsilane | 2 parts |
| silicone oil (mw 5000) | 70 parts |
| dibutyl tin diacetate | 0.05 parts |

Hardening took place for 2 days at 23° C. and 50% relative humidity. The gel obtained had a modulus of elasticity $E' = 2 \times 10^5$ Pa and a loss factor of $d = 0.5$.

EXAMPLE 2

Thermosetting Silicone Gel

A mixture of the following components was prepared:

| | |
|---|---|
| silicone oligomer (SILGEL 612 B component A produced by Wacker) | 10 parts |
| silicone oligomer (SILGEL 612 B component B produced by Wacker) | 10 parts |
| silicon oil (mw 5000) | 50 parts |

The mixture was hardened for 30 minutes at 100° C. and had a modulus of elasticity $E' = 10^5$ Pa and a loss factor of $d = 0.5$.

EXAMPLE 3

Plastisol

A mixture was prepared from the following components:

| | |
|---|---|
| PVC homopolymer (K-value 70) | 7 parts |
| methylmethacrylate/butylmethacrylate copolymer (MMA:BMA = 65:35; mw > 300,000) | 7 parts |
| di-2-ethylhexylphthalate | 86 parts |

This plastisol was hardened to a plastigel by heating for 30 minutes at 150° C. It had a modulus of elasticity $E' = 1.7 \times 10^5$ Pa and a loss factor $d = 0.5$.

EXAMPLE 4

Polyurethane Gel

A mixture of the following components was prepared:

| | |
|---|---|
| poly(propyleneoxide/ethyleneoxide)copolymer (triol, mw 3000; ethyleneoxide fraction approx. 18%) | 28 parts |
| polypropyleneglycol (diol, mw 2000) | 21 parts |
| TMXDI | 6 parts |
| di-$C_7$-$C_{11}$-alkyl phthalate | 70 parts |
| dibutyl tin dilaurate | 0.01 parts |

Heating took place for 45 minutes at 150° C. for hardening purposes. The hardened material had a modulus of elasticity $E' = 1.0 \times 10^5$ and a loss factor $d = 0.76$.

EXAMPLE 5

Polyurethane Gel

A mixture was prepared from the following components:

| | |
|---|---|
| poly(propyleneoxide/ethyleneoxide)copolymer (triol, mw 3000, ethyleneoxide fraction approx. 18%) | 20 parts |
| poly(neopentylglycoladipate) (diol, mw 2000) | 30 parts |
| MDI | 7.7 parts |
| di-$C_7$-$C_{12}$-alkyl phthalate | 60 parts |
| amine catalyst (NIAX A 6) | 0.35 parts |
| dibutyl tin dilaurate | 0.01 parts |

Heating took place for 10 minutes at 55° C. in order to harden the mixture to a polyurethane gel. The material had a modulus of elasticity $E'=1\times 10^5$ Pa and a loss factor $d=0.75$.

Figure 2:
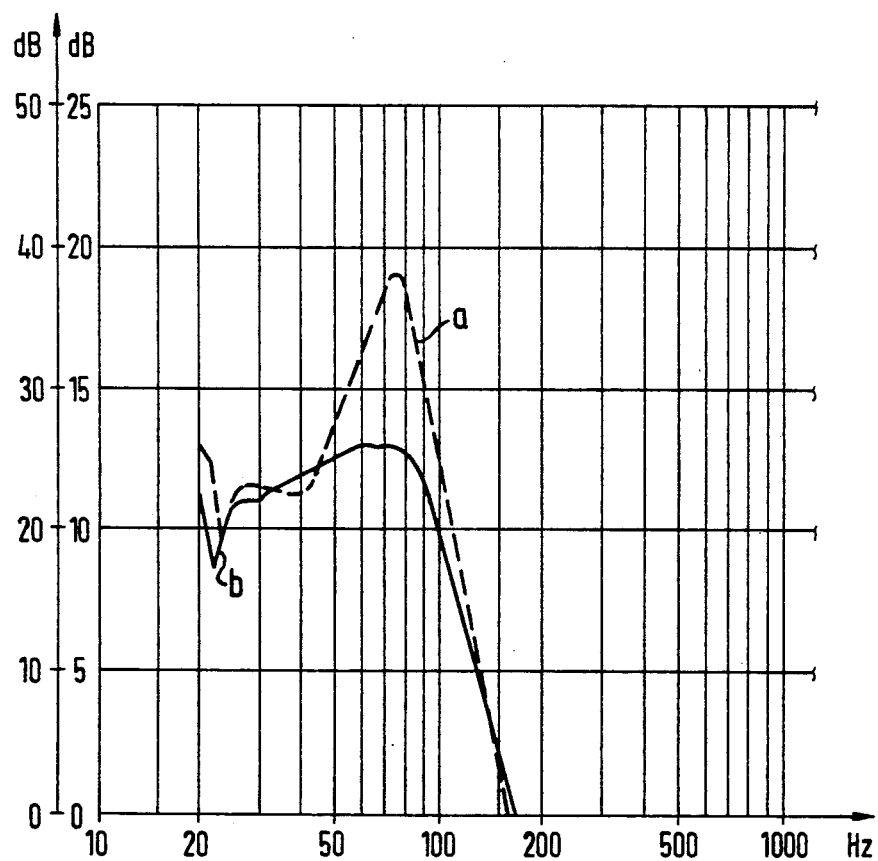
FIG. 2 is a comparison plot of vibrometer measuring curves for (a) the prior art and (b) an embodiment of the present invention.

The attached FIG. 2 shows the vibrometer measuring curves a) for a viscoelastic polyurethane foam according to the prior art ($E'=1.5\times 10^5$ Pa; $d=0.3$) and b) for an inventive polyurethane gel ($E'=0.9\times 10^5$ Pa; $d=0.8$). During the measurement, in each case a $50\times 50$ mm metal plate was electromagnetically vibrated. The frequency was varied and the acceleration kept constant over the frequency (0.1 g). A sample of the test material of $50\times 50$ mm was in each case placed loosely on the baseplate and provided with a cover mass (50 g including acceleration pick-up). The vibration amplitude of the cover mass was plotted as a function of the exciting frequency.

The measurement curves clearly show the superiority of the inventive material in the in practice important range of 40 to 100 Hz.

We claim:

1. Mass and spring system for soundproofing, particularly in vehicles, comprising a bending-soft heavy plastic layer as the mass and a soft layer as the spring and which is applied to (a sound radiating surface or wall,) characterized in that the soft layer serving as a spring is a gel of 10 to 50% by weight of an organic polymer or silicone polymer and 50 to 90% by weight of a plasticizer compatible therewith, which at room temperature has a modulus of elasticity $E'\leqq 5\times 10^5$ Pa and an internal loss factor $d\geqq 0.5$.

2. Mass and spring system according to claim 1, characterized in that the soft layer serving as the spring is foamed.

3. Mass and spring system according to one of the claims 1 or 2, characterized in that the soft layer serving as the spring is a gel of a polyurethane polymer and a plasticizer.

4. Mass and spring system according to claim 3, characterized in that the gel comprises 30 to 50% by weight of polyurethane polymer and 50 to 70% by weight of plasticizer.

5. Mass and spring system according to one of the claims 1 or 2, characterized in that the soft layer serving as the spring is a plastigel of polyvinyl chloride homopolymer or copolymer and/or methylmethacrylate copolymer and/or styrene homopolymer or copolymer and plasticizers.

6. Mass and spring system according to claim 5, characterized in that the gel comprises 10 to 20% by weight of polymer and 80 to 90% by weight of plasticizer.

7. Mass and spring system according to one of the claims 1 or 2, characterized in that the soft layer serving as the spring is a gel of a moisture or heat-hardening polydimethylsiloxane and a silicone oil as the plasticizer.

8. Mass and spring system according to claim 7, characterized in that the mixture comprises 15 to 40% by weight of polydimethylsiloxane and 60 to 85% by weight of silicone oil.

9. Mass and spring system according to claim 1 characterized in that between the soft layer serving as the spring and the heavy plastic layer is provided a soft polyurethane foam.

10. Multilayer system for soundproofing purposes, particularly for solid-borne sound insulation and airborne sound insulation, comprising a plurality of flexurally rigid layers and at least one deadening, soft intermediate layer, characterized in that the intermediate layer is a gel of 10 to 50% by weight of an organic polymer or silicone polymer and 50 to 90% by weight of a plasticizer compatible therewith, which at room temperature has a modulus of elasticity $E'\leqq 5\times 10^5$ Pa and an internal loss factor $d\geqq 0.5$.

11. Multilayer system according to claim 10, characterized in that the gel is a polymer selected from the group consisting of polyurethane, polyvinylchloride homopolymer or copolymer, methylmethacrylate copolymer, styrene homopolymer or copolymer, a moisture or heat-hardening polymethylsiloxane, or polyurethane foam; and a plasticizer compatible therewith.

12. A mass and spring system for soundproofing a sound radiating surface or wall, comprising a bending-soft heavy plastic layer as the mass and a soft layer as the spring, wherein the soft layer serving as a spring is a gel selected from the group consisting of
 a) 30 to 50% by weight of a polyurethane polymer and 50 to 70% by weight of a plasticizer compatible therewith;
 b) a plastigel comprised of 10 to 20% by weight of polymer selected from the group comprising of polyvinyl chloride homopolymer or copolymer, methylmethacrylate copolymer and styrene homopolymer or copolymer, and 80 to 90% by weight of plasticizer compatible therewith; and
 c) 15 to 40% by weight of a moisture or heat-hardening polydimethylsiloxane and 60 to 85% by weight of a silicone oil as a plasticizer; and
which at room temperature has a modulus of elasticity of $E'\leqq 5\times 10^5$ Pa and an internal loss factor $d\geqq 0.5$.

13. Mass and spring system as in claim 12, wherein there is provided a soft polyurethane foam between the mass and spring.

14. Mass and spring system as in claim 12, wherein the soft layer serving as a spring is foamed.

* * * * *